(12) United States Patent
Chapa (10) Patent No.: US 11,293,159 B1
(45) Date of Patent: Apr. 5, 2022

(54) METHOD OF MAINTAINING SOIL STRENGTH AND STABILITY

(71) Applicant: CB Geotex LLC, Melissa, TX (US)

(72) Inventor: Xavier Chapa, Melissa, TX (US)

(73) Assignee: CB Geotex LLC, Melissa, TX (US)

( * ) Notice: Subject to any disclaimer, the term of this patent is extended or adjusted under 35 U.S.C. 154(b) by 0 days.

(21) Appl. No.: 17/147,700

(22) Filed: Jan. 13, 2021

(51) Int. Cl.
*E02D 17/20* (2006.01)
*C09K 17/22* (2006.01)
*C09K 17/40* (2006.01)
*D06N 3/06* (2006.01)
*D06N 3/04* (2006.01)
(Continued)

(52) U.S. Cl.
CPC ............ *E02D 17/202* (2013.01); *C09K 17/22* (2013.01); *C09K 17/40* (2013.01); *D06N 3/0006* (2013.01); *D06N 3/0011* (2013.01); *D06N 3/0059* (2013.01); *D06N 3/0063* (2013.01); *D06N 3/042* (2013.01); *D06N 3/045* (2013.01); *D06N 3/06* (2013.01); *D06N 3/106* (2013.01); *D06N 3/128* (2013.01); *D06N 3/14* (2013.01); *D06N 3/18* (2013.01); *D06N 2201/0254* (2013.01); *D06N 2201/0263* (2013.01); *D06N 2203/041* (2013.01); *D06N 2203/042* (2013.01); *D06N 2203/047* (2013.01); *D06N 2203/048* (2013.01); *D06N 2203/066* (2013.01); *D06N 2203/068* (2013.01); *D06N 2205/10* (2013.01); *D06N 2209/128* (2013.01); *E02D 2300/0001* (2013.01); *E02D 2300/001* (2013.01); *E02D 2300/0006* (2013.01);
(Continued)

(58) Field of Classification Search
CPC .............. E02D 17/202; E02D 23/0001; E02D 23/0006; E02D 23/0009; E02D 23/001; E02D 23/0079; E02D 23/0085; E02D 23/0092; E02D 23/0095; C09K 17/22; C09K 17/40; D06N 3/0006; D06N 3/0011; D06N 3/0059; D06N 3/0063; D06N 3/042; D06N 3/045; D06N 3/06; D06N 3/106; D06N 3/128; D06N 3/14; D06N 3/18; D06N 3/0068; D06N 2201/0254; D06N 2201/0263; D06N 2203/041; D06N 2203/042; D06N 2203/047; D06N 2203/048; D06N 2203/066; D06N 2203/068; D06N 2205/10; D06N 2209/128
USPC ........................................................ 405/302.7
See application file for complete search history.

(56) References Cited

U.S. PATENT DOCUMENTS

| | | |
|---|---|---|
| 4,113,799 A | 9/1978 | Van Ornum et al. |
| 4,129,542 A | 12/1978 | Matheson et al. |
| 4,536,454 A | 8/1985 | Haasl |
| 4,684,288 A | 8/1987 | Chapa |
| 5,314,940 A | 5/1994 | Stone |
| 6,858,272 B2 | 2/2005 | Squires |
| 6,863,477 B2 | 3/2005 | Jenkins et al. |

(Continued)

FOREIGN PATENT DOCUMENTS

WO WO-2019224763 A1 * 11/2019 ............... B32B 5/10

*Primary Examiner* — Tara Mayo-Pinnock
(74) *Attorney, Agent, or Firm* — Grady K. Bergen; Griggs Bergen LLP (57) ABSTRACT

A method of maintaining soil strength and stability involves positioning a sheet of soil stabilization and strengthening material on a selected area where the strengthening and stabilization of the soil is desired. The sheet of soil stabilization and strengthening material includes a fabric layer that forms a base of the soil stabilization and strengthening material. The lower surface of the fabric layer is positioned against and engages the selected area. A moisture impervious layer is coupled to the upper surface of the fabric layer. A particulate aggregate material is embedded in the moisture impervious layer.

20 Claims, 3 Drawing Sheets

(51) Int. Cl.
  *D06N 3/00*  (2006.01)
  *D06N 3/10*  (2006.01)
  *D06N 3/12*  (2006.01)
  *D06N 3/18*  (2006.01)
  *D06N 3/14*  (2006.01)

(52) U.S. Cl.
  CPC .............. *E02D 2300/0009* (2013.01); *E02D 2300/0079* (2013.01); *E02D 2300/0085* (2013.01); *E02D 2300/0092* (2013.01); *E02D 2300/0095* (2013.01)

(56) References Cited

U.S. PATENT DOCUMENTS

| | | |
|---|---|---|
| 7,001,111 B2 | 2/2006 | Maxwell et al. |
| 7,015,297 B2 | 3/2006 | Schindler et al. |
| 7,332,541 B2 | 2/2008 | Schindler et al. |
| 8,932,709 B2 | 1/2015 | Carter |
| 9,528,005 B1 | 12/2016 | Miriani et al. |
| 9,586,751 B1 | 3/2017 | Swift |
| 9,593,459 B2 | 3/2017 | Dudding |
| 10,131,773 B2 | 11/2018 | Welle, IV |
| 2001/0002497 A1 | 6/2001 | Scuero |
| 2009/0282733 A1* | 11/2009 | Moore, Jr. ......... A01G 13/0281 47/31 |
| 2011/0166280 A1 | 7/2011 | Davio et al. |
| 2011/0178220 A1 | 7/2011 | Davio et al. |
| 2012/0142857 A1 | 6/2012 | Hatanaka et al. |
| 2017/0369740 A1 | 12/2017 | Stanjek et al. |
| 2019/0161931 A1 | 5/2019 | Cooley et al. |

\* cited by examiner

METHOD OF MAINTAINING SOIL STRENGTH AND STABILITY

BACKGROUND

Moisture can be significant problem in maintaining the structural integrity of load bearing soils on level planes and steep slopes. Loss of structural integrity occurs in areas where there is no sufficient ground cover or vegetation to prevent soil being washed away by erosive elements, such as water, wind, etc. This can be a particular problem in areas of construction, such as road and building construction, where excavation typically removes the ground cover leaving the underlying soil exposed and subject to softening from moisture penetration. This can also be a problem on tennis or basketball courts, in playgrounds, or golf cart paths in golf courses.

Current and past methods have been insufficient or inadequate in strengthening and stabilizing the earth and preventing soil erosion. The present invention seeks to overcome the shortcomings of these prior art methods.

BRIEF DESCRIPTION OF THE DRAWINGS

For a more complete understanding of the embodiments described herein, and the advantages thereof, reference is now made to the following descriptions taken in conjunction with the accompanying figures, in which.

DETAILED DESCRIPTION

Figure 1:
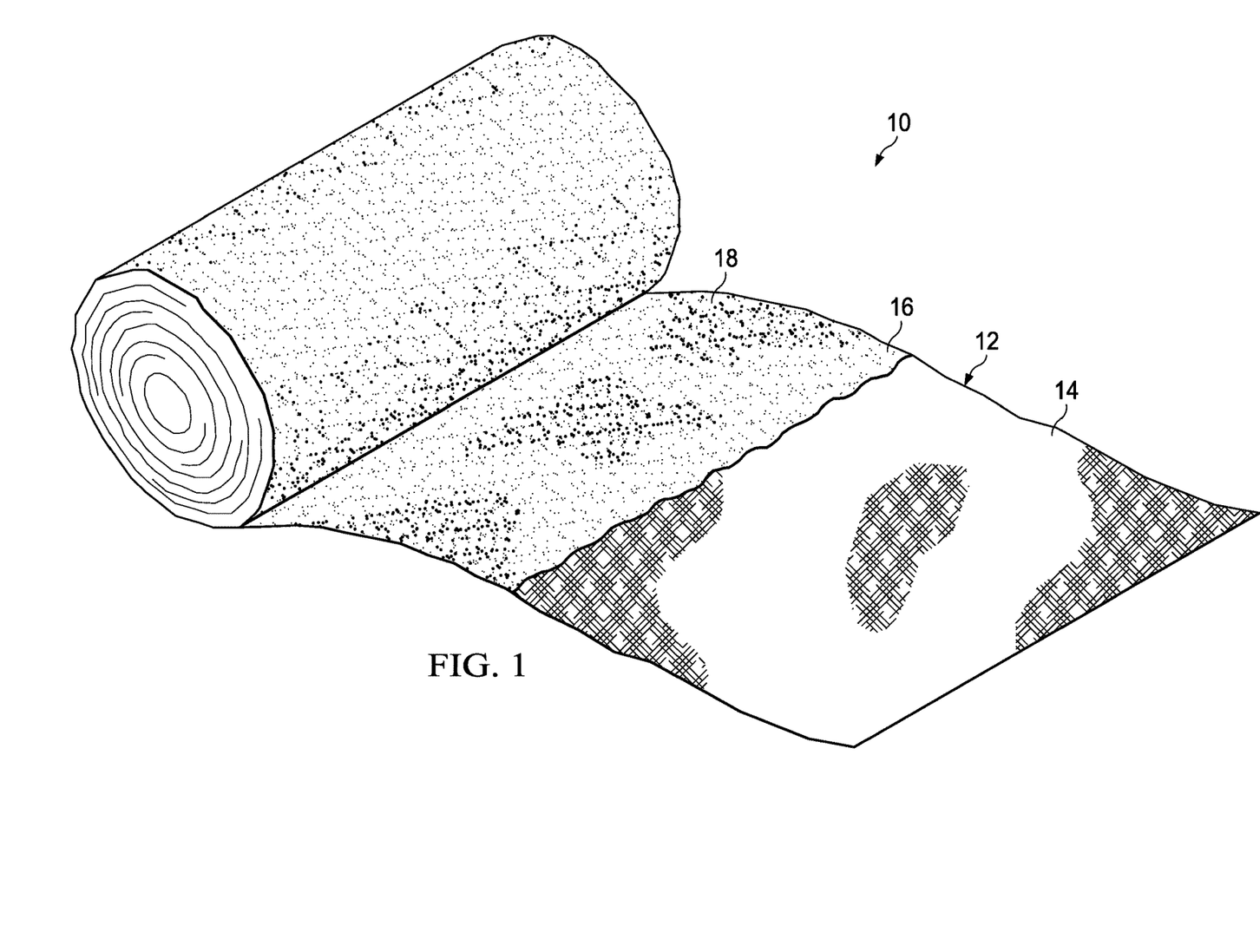
FIG. 1 is perspective view of a roll of soil stabilization and strengthening material configured in accordance with a particular embodiment of the invention, shown with layers of the material cut away to show its construction.

Referring to FIG. 1, a roll 10 of a soil stabilization and strengthening material 12 is shown. The material 12 is formed as a sheet with various layers that facilitate the strengthening and stabilizing soil and preventing soil erosion when applied to a soil or earth surface. The material 12 includes a lower fabric material base layer 12. The layer 12 may be a geotextile for engagement with the earth, soil or ground plants. The fabric material 12 may be a woven, non-woven, needle punched, or heat bonded fabric material. In certain applications, the fabric material 12 may be formed from a woven or non-woven polymeric fiber material, such as polypropylene, polyethylene, polyester, polyamide, polyurea, etc. In other embodiments, it may contain metal or comprise a metal wire mesh material. In certain embodiments, the fabric layer 12 is a non-metal fabric material and contains no metal. Fiberglass, such as a fiberglass mesh, may also be used for or as a component of the fabric base layer 12. Natural materials, such as jute or coir, may also be used for or as a component of the fabric layer 12. The layer 12 may be formed from one or more fabric layers that are combined or laminated together. The fabric 12 should be a UV resistant, rot resistant and moisture resistant fabric, although it may be permeable or non-permeable to moisture.

All or a portion of the geotextile layer 12 may have a thickness of from 0.5 mm to 7.0 mm. In certain cases, the geotextile layer 12 may have a thickness along all or a portion of its width and length of at least, equal to, and/or between any two of 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, and 7.0 mm.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range.

In certain embodiments, the weight of the fabric material 12 may range from 3 oz/yd$^2$ to 50 oz/yd$^2$, as measured according to ASTM D5261. In some applications, the weight of the fabric may at least, equal to, and/or between any two of 3 oz/yd$^2$, 4 oz/yd$^2$, 5 oz/yd$^2$, 6 oz/yd$^2$, 7 oz/yd$^2$, 8 oz/yd$^2$, 9 oz/yd$^2$, 10 oz/yd$^2$, 11 oz/yd$^2$, 12 oz/yd$^2$, 13 oz/yd$^2$, 14 oz/yd$^2$, 15 oz/yd$^2$, 16 oz/yd$^2$, 17 oz/yd$^2$, 18 oz/yd$^2$, 19 oz/yd$^2$, 20 oz/yd$^2$, 21 oz/yd$^2$, 22 oz/yd$^2$, 23 oz/yd$^2$, 24 oz/yd$^2$, 25 oz/yd$^2$, 26 oz/yd$^2$, 27 oz/yd$^2$, 28 oz/yd$^2$, 29 oz/yd$^2$, 30 oz/yd$^2$, 31 oz/yd$^2$, 32 oz/yd$^2$, 33 oz/yd$^2$, 34 oz/yd$^2$, 35 oz/yd$^2$, 36 oz/yd$^2$, 37 oz/yd$^2$, 38 oz/yd$^2$, 39 oz/yd$^2$, 40 oz/yd$^2$, 41 oz/yd$^2$, 42 oz/yd$^2$, 43 oz/yd$^2$, 44 oz/yd$^2$, 45 oz/yd$^2$, 46 oz/yd$^2$, 47 oz/yd$^2$, 48 oz/yd$^2$, 49 oz/yd$^2$, and 50 oz/yd$^2$, as measured according to ASTM D5261.

The fabric layer 14 may have a grab tensile strength of from 50 lbs to 1000 lbs, as measured according to ASTM D4632. This may be in either the warp or weft direction or both. In particular embodiments, the fabric layer 14 may have a grab tensile strength of at least, equal to, and/or between any two of 50 lbs, 51 lbs, 52 lbs, 53 lbs, 54 lbs, 55 lbs, 56 lbs, 57 lbs, 58 lbs, 59 lbs, 60 lbs, 61 lbs, 62 lbs, 63 lbs, 64 lbs, 65 lbs, 66 lbs, 67 lbs, 68 lbs, 69 lbs, 70 lbs, 71 lbs, 72 lbs, 73 lbs, 74 lbs, 75 lbs, 76 lbs, 77 lbs, 78 lbs, 79 lbs, 80 lbs, 81 lbs, 82 lbs, 83 lbs, 84 lbs, 85 lbs, 86 lbs, 87 lbs, 88 lbs, 89 lbs, 90 lbs, 91 lbs, 92 lbs, 93 lbs, 94 lbs, 95 lbs, 96 lbs, 97 lbs, 98 lbs, 99 lbs, 100 lbs, 105 lbs, 110 lbs, 115 lbs, 120 lbs, 125 lbs, 130 lbs, 135 lbs, 140 lbs, 145 lbs, 150 lbs, 155 lbs, 160 lbs, 165 lbs, 170 lbs, 175 lbs, 180 lbs, 185 lbs, 190 lbs, 195 lbs, 200 lbs, 205 lbs, 210 lbs, 215 lbs, 220 lbs, 225 lbs, 230 lbs, 235 lbs, 240 lbs, 245 lbs, 250 lbs, 255 lbs, 260 lbs, 265 lbs, 270 lbs, 275 lbs, 280 lbs, 285 lbs, 290 lbs, 295 lbs, 300 lbs, 305 lbs, 310 lbs, 315 lbs, 320 lbs, 325 lbs, 330 lbs, 335 lbs, 340 lbs, 345 lbs, 350 lbs, 355 lbs, 360 lbs, 365 lbs, 370 lbs, 375 lbs, 380 lbs, 385 lbs, 390 lbs, 395 lbs, 400 lbs, 405 lbs, 410 lbs, 415 lbs, 420 lbs, 425 lbs, 430 lbs, 435 lbs, 440 lbs, 445 lbs, 450 lbs, 455 lbs, 460 lbs, 465 lbs, 470 lbs, 475 lbs, 480 lbs, 485 lbs, 490 lbs, 495 lbs, 500 lbs, 505 lbs, 510 lbs, 515 lbs, 520 lbs, 525 lbs, 530 lbs, 535 lbs, 540 lbs, 545 lbs, 550 lbs, 555 lbs, 560 lbs, 565 lbs, 570 lbs, 575 lbs, 580 lbs, 585 lbs, 590 lbs, 595 lbs, 600 lbs, 605 lbs, 610 lbs, 615 lbs, 620 lbs, 625 lbs, 630 lbs, 635 lbs, 640 lbs, 645 lbs, 650 lbs, 655 lbs, 660 lbs, 665 lbs, 670 lbs, 675 lbs, 680 lbs, 685 lbs, 690 lbs, 695 lbs, 700 lbs, 705 lbs, 710 lbs, 715 lbs, 720 lbs, 725 lbs, 730 lbs, 735 lbs, 740 lbs, 745 lbs, 750 lbs, 755 lbs, 760 lbs, 765 lbs, 770 lbs, 775 lbs, 780 lbs, 785 lbs, 790 lbs, 795 lbs, 800 lbs, 805 lbs, 810 lbs, 815 lbs, 820 lbs, 825 lbs, 830 lbs, 835 lbs, 840 lbs, 845 lbs, 850 lbs, 855 lbs, 860 lbs, 865 lbs, 870 lbs, 875 lbs, 880 lbs, 885 lbs, 890 lbs, 895 lbs, 900 lbs, 905 lbs, 910 lbs, 915 lbs, 920 lbs, 925 lbs, 930 lbs, 935 lbs, 940 lbs, 945 lbs, 950 lbs, 955 lbs, 960 lbs, 965 lbs, 970 lbs, 975 lbs, 980 lbs, 985 lbs, 990 lbs, 995 lbs, and 1000 lbs, as measured according to ASTM D4632.

Applied to the fabric material base 14 is a moisture impervious layer 16. The layer 16 may be a flexible rubber or elastomeric material that is coupled to the upper surface of the fabric material 14. The material 16 may be initially soft and flowable or mastic-like so that it can be readily applied and spread over the surface of the fabric layer 14. The material 16 may then harden or cure, while still remaining flexible. The material of layer 16 should adhere to the upper surface of the layer 14 but not be so fluid as to penetrate the fabric layer 14. The lower surface of the fabric layer 14 may remain exposed and free from any coatings.

The layer 16 may be a monolithic layer cast as a single layer over the fabric base 14 as a continuous and uninterrupted layer over the entire surface of the fabric layer 14. In other embodiments, the moisture impervious layer 16 may be non-continuous and cover only a portion or portions of the base layer 14, such as in spaced apart patches, strips or sections. In most instances, the layer 16 will cover all (i.e., 100%) or a major portion (i.e., from >50%, 55%, 60%, 65%, 70%, 75%, 80%, 85%, 90%, or 95% to <100%) of the upper surface area of the layer 14.

In certain applications, strips or sections along one or more sides of the fabric layer 14 or other areas of the sheet 12 may be free of the moisture impervious material 16. These areas may be provided with apertures that may be reinforced, such as with grommets, etc., for receiving stakes or other fastening devices to facilitate securing the sheet material 12 to the earth, soil or area where soil stabilization and strength is desired. In other embodiments, the moisture impervious material 16 may extend to the side edges of the sheet 12 with the apertures being formed in both the fabric 14 and material 16.

A wide variety of materials can be used for the moisture impervious layer 16. These may include various curable polymeric or elastomeric materials, such as including, but not limited to, polymers and copolymers of urethane, silicone, acrylate, vinyl chloride, acrylonitrile, ethylene, propylene, butadiene, isoprene, styrene, vinyl acetate, methacrylate, methyl methacrylate, vinyl acetate, etc., and combinations of these and their copolymers. Non-limiting examples of various copolymer materials include acrylonitrile/butadiene/styrene copolymer, ethylene propylene diene monomer (EPDM), ethylene/vinyl acetate copolymer, acrylonitrile/butadiene copolymer, styrene/butadiene copolymer, chlorinated polyethylene, methyl methacrylate/butadiene/styrene copolymer, butadiene-vinylpyridine copolymer, isoprene-isobutylene copolymer, etc. Other monomers and polymers and copolymers may also be used provided they provide the same functionality described herein. The layer 16 may also comprise a latex rubber material. These materials may be thermoplastic materials that may be heated so that they are soft and flowable upon heating but set or hardened upon cooling. Alternatively, they may be initially in a soft, uncured state and then cure to hardened state. While in the hardened state, the material 16 should still provide sufficient flexibility so that it can function as described herein.

In particular embodiments, the material of layer 16 is formed from a polyether-based silane-terminated polymer, alone or in combination with other polymer and copolymer materials. Examples of such materials for the layer 16 include those commercially available and marketed as FLEX SEAL® products, from Swift Response, LLC, and GENIOSIL® products, from Wacker Chemie AG.

The aforementioned materials for layer 16 may be used alone or in combination with other materials and additives. These may include bituminous material such as asphalt or blend of asphalts, fillers, vulcanization agents, cross-linking agents, catalysts, activators, accelerators, plasticizers, UV inhibitors, dehydrators, etc.

Examples of suitable materials for forming the layer 16 are described, in whole or in part, in U.S. Pat. Nos. 4,113, 799; 4,129,542; 4,536,454; 5,314,940; 7,015,297; 7,332, 541; and 9,528,005; 9,586,751; and U.S. Pat. App. Pub. Nos. US2011/0166280; US2011/0178220; US2012/0142857; and US2017/0369740, each of which is hereby incorporated by reference in its entirety for all purposes, including those monomers, polymers, elastomers, and method of forming such materials described therein.

All or a portion of the moisture impervious layer 16 may have a thickness of from 0.5 mm to 7.0 mm when applied to the upper surface of the layer 14. In certain cases, the moisture impervious layer 16 may have a thickness along all or a portion of its width and length of at least, equal to, and/or between any two of 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, and 7.0 mm.

The weight of the moisture impervious material 16 applied to the fabric layer 14 may range from 3 oz/yd$^2$ to 250 oz/yd$^2$. In particular applications, the weight of the moisture impervious material 16 applied to the fabric layer 14 may have a weight of at least, equal to, and/or between any two of 3 oz/yd$^2$, 4 oz/yd$^2$, 5 oz/yd$^2$, 6 oz/yd$^2$, 7 oz/yd$^2$, 8 oz/yd$^2$, 9 oz/yd$^2$, 10 oz/yd$^2$, 11 oz/yd$^2$, 12 oz/yd$^2$, 13 oz/yd$^2$, 14 oz/yd$^2$, 15 oz/yd$^2$, 16 oz/yd$^2$, 17 oz/yd$^2$, 18 oz/yd$^2$, 19 oz/yd$^2$, 20 oz/yd$^2$, 21 oz/yd$^2$, 22 oz/yd$^2$, 23 oz/yd$^2$, 24 oz/yd$^2$, 25 oz/yd$^2$, 26 oz/yd$^2$, 27 oz/yd$^2$, 28 oz/yd$^2$, 29 oz/yd$^2$, 30 oz/yd$^2$, 31 oz/yd$^2$, 32 oz/yd$^2$, 33 oz/yd$^2$, 34 oz/yd$^2$, 35 oz/yd$^2$, 36 oz/yd$^2$, 37 oz/yd$^2$, 38 oz/yd$^2$, 39 oz/yd$^2$, 40 oz/yd$^2$, 41 oz/yd$^2$, 42 oz/yd$^2$, 43 oz/yd$^2$, 44 oz/yd$^2$, 45 oz/yd$^2$, 46 oz/yd$^2$, 47 oz/yd$^2$, 48 oz/yd$^2$, 49 oz/yd$^2$, 50 oz/yd$^2$, 51 oz/yd$^2$, 52 oz/yd$^2$, 53 oz/yd$^2$, 54 oz/yd$^2$, 55 oz/yd$^2$, 56 oz/yd$^2$, 57 oz/yd$^2$, 58 oz/yd$^2$, 59 oz/yd$^2$, 60 oz/yd$^2$, 61 oz/yd$^2$, 62 oz/yd$^2$, 63 oz/yd$^2$, 64 oz/yd$^2$, 65 oz/yd$^2$, 66 oz/yd$^2$, 67 oz/yd$^2$, 68 oz/yd$^2$, 69 oz/yd$^2$, 70 oz/yd$^2$, 71 oz/yd$^2$, 72 oz/yd$^2$, 73 oz/yd$^2$, 74 oz/yd$^2$, 75 oz/yd$^2$, 76 oz/yd$^2$, 77 oz/yd$^2$, 78 oz/yd$^2$, 79 oz/yd², 80 oz/yd², 81 oz/yd², 82 oz/yd², 83 oz/yd², 84 oz/yd², 85 oz/yd², 86 oz/yd², 87 oz/yd², 88 oz/yd², 89 oz/yd², 90 oz/yd², 91 oz/yd², 92 oz/yd², 93 oz/yd², 94 oz/yd², 95 oz/yd², 96 oz/yd², 97 oz/yd², 98 oz/yd², 99 oz/yd², 100 oz/yd², 105 oz/yd², 110 oz/yd², 115 oz/yd², 120 oz/yd², 125 oz/yd², 130 oz/yd², 135 oz/yd², 140 oz/yd², 145 oz/yd², 150 oz/yd², 155 oz/yd², 160 oz/yd², 165 oz/yd², 170 oz/yd², 175 oz/yd², 180 oz/yd², 185 oz/yd², 190 oz/yd², 195 oz/yd², 200 oz/yd², 205 oz/yd², 210 oz/yd², 215 oz/yd², 220 oz/yd², 225 oz/yd², 230 oz/yd², 235 oz/yd², 240 oz/yd², 245 oz/yd², and 250 oz/yd².

An aggregate material 18 is embedded in or applied to the surface of the moisture impervious layer 16. The aggregate 18 is small particles, such as small gravel, pea gravel, crushed granite or other stone material, coarse sand, ground oyster shells, etc., or combinations of these or other materials. The particles may be smooth or jagged particles or a mixture of smooth and jagged particles. The aggregate 18 may be selected to provide a desired color or combination of colors or decorative appearance to the sheet 12.

The aggregate may have a particle size of from 1.0 mm to 10.0 mm. The particles may be of substantially uniform size or a mixture of different size particles. In particular embodiments, the aggregate may have a particles size of from 6.0 mm or less, more particularly from 4.0 mm or less. In certain cases, the aggregate 18 may have a particle size of at least, equal to, and/or between any two of 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, 7.0 mm, 7.0 mm, 7.1 mm, 7.2 mm, 7.3 mm, 7.4 mm, 7.5 mm, 7.6 mm, 7.7 mm, 7.8 mm, 7.9 mm, 8.0 mm, 8.1 mm, 8.2 mm, 8.3 mm, 8.4 mm, 8.5 mm, 8.6 mm, 8.7 mm, 8.8 mm, 8.9 mm, 9.0 mm, 9.1 mm, 9.2 mm, 9.3 mm, 9.4 mm, 9.5 mm, 9.6 mm, 9.7 mm, 9.8 mm, 9.9 mm, and 10.0 mm.

The aggregate material may be mixed or applied to the material of the moisture impervious layer 16 while it is uncured or in an initial soft state so that the aggregate is fixed or embedded in the material 16 upon curing or during use. While some or a minor amount of aggregate particles may be fully embedded in the material 15, portions, which may be major portions (i.e., from >50%, 55%, 60%, 65%, 70%, 75%, 80%, 85%, 90%, or 95% to <100%) of the aggregate particles 18 will typically project from the upper surface of the layer 16 and be exposed, with only the lower portion of the particles 18 being embedded in the material 16, so that the material 12 has an exposed upper surface that is formed at least in part by the exposed portions of the aggregate 18.

The aggregate 18 may be spread or dispersed over the layer 16 as a single layer of particles. The aggregate may be uniformly or substantially uniformly dispersed over the surface area of the layer 16 so that the aggregate is not concentrated in certain areas of the material 12. The exposed aggregate 18 may provide a coverage area of the moisture impervious layer 16 that is from 5% to 99% of the upper surface of the layer 16, with the individual exposed aggregate particles being either spaced apart and/or in a touching or near touching configuration with gaps resulting from the non-uniform shape and configuration of the individual aggregate particles even when in a touching relationship so that less than 100% coverage of the layer 16 is typically not possible. In particular embodiments, the exposed aggregate 18 may provide a surface coverage area of at least equal to, and/or between any two of 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, and 100% of the of the upper surface of the layer 16.

The aggregate 18 should be present in the sheet material 12 so that it does not add too much weight to interfere with the use and handling of the sheet 12 during installation and removal. The aggregate 18 may provide a weighting function, however, to facilitate keeping the sheet material 12 pressed and conformed against the surface on which it is overlaid. In certain embodiments, the weight of the aggregate material 18 of the soil stabilization and strengthening sheet material 12 may range from 5 oz/yd² to 500 oz/yd². In particular embodiments, the weight of the aggregate material 18 of the soil stabilization and strengthening sheet material 12 may be at least, equal to, and/or between any two of 5 oz/yd², 6 oz/yd², 7 oz/yd², 8 oz/yd², 9 oz/yd², 10 oz/yd², 11 oz/yd², 12 oz/yd², 13 oz/yd², 14 oz/yd², 15 oz/yd², 16 oz/yd², 17 oz/yd², 18 oz/yd², 19 oz/yd², 20 oz/yd², 21 oz/yd², 22 oz/yd², 23 oz/yd², 24 oz/yd², 25 oz/yd², 26 oz/yd², 27 oz/yd², 28 oz/yd², 29 oz/yd², 30 oz/yd², 31 oz/yd², 32 oz/yd², 33 oz/yd², 34 oz/yd², 35 oz/yd², 36 oz/yd², 37 oz/yd², 38 oz/yd², 39 oz/yd², 40 oz/yd², 41 oz/yd², 42 oz/yd², 43 oz/yd², 44 oz/yd², 45 oz/yd², 46 oz/yd², 47 oz/yd², 48 oz/yd², 49 oz/yd², 50 oz/yd², 51 oz/yd², 52 oz/yd², 53 oz/yd², 54 oz/yd², 55 oz/yd², 56 oz/yd², 57 oz/yd², 58 oz/yd², 59 oz/yd², 60 oz/yd², 61 oz/yd², 62 oz/yd², 63 oz/yd², 64 oz/yd², 65 oz/yd², 66 oz/yd², 67 oz/yd², 68 oz/yd², 69 oz/yd², 70 oz/yd², 71 oz/yd², 72 oz/yd², 73 oz/yd², 74 oz/yd², 75 oz/yd², 76 oz/yd², 77 oz/yd², 78 oz/yd², 79 oz/yd², 80 oz/yd², 81 oz/yd², 82 oz/yd², 83 oz/yd², 84 oz/yd², 85 oz/yd², 86 oz/yd², 87 oz/yd², 88 oz/yd², 89 oz/yd², 90 oz/yd², 91 oz/yd², 92 oz/yd², 93 oz/yd², 94 oz/yd², 95 oz/yd², 96 oz/yd², 97 oz/yd², 98 oz/yd², 99 oz/yd², 100 oz/yd², 105 oz/yd², 110 oz/yd², 115 oz/yd², 120 oz/yd², 125 oz/yd², 130 oz/yd², 135 oz/yd², 140 oz/yd², 145 oz/yd², 150 oz/yd², 155 oz/yd², 160 oz/yd², 165 oz/yd², 170 oz/yd², 175 oz/yd², 180 oz/yd², 185 oz/yd², 190 oz/yd², 195 oz/yd², 200 oz/yd², 205 oz/yd², 210 oz/yd², 215 oz/yd², 220 oz/yd², 225 oz/yd², 230 oz/yd², 235 oz/yd², 240 oz/yd², 245 oz/yd², and 250 oz/yd², 300 oz/yd², 350 oz/yd², 400 oz/yd², 450 oz/yd², and 500 oz/yd² of the sheet material 12.

In forming the soil stabilization and strengthening sheet material 12, the moisture impervious material 16 is applied to an upper surface of the fabric layer 14. The fabric material 14 may be of selected lengths and widths. The material 16 is then applied, such as through an applicator or dispensing apparatus, while it is in a softened or uncured liquid or flowable state so that it is uniformly applied and spread over the surface of the fabric layer 14. For thermoplastic materials, this may require heating of the material so that it is soft and flowable. In certain instances, the fabric material 14 may be moved, such as by a conveyor system, while the applicator remains stationary. In other instances, the applicator may be moved along the length of the fabric layer 14, which remains stationary. Smoothing or spreading devices, such as blades or squeegees, may be used in certain instances to provide a uniform, even coating of the material 16 on the fabric 14.

While the material 16 is in a softened or uncured state on the fabric layer 14, the particulate aggregate material is applied to the layer 16. This may be achieved through the use of a dispensing device or apparatus, such as a hopper with a valve to facilitate application of the aggregate. Smoothing devices may also be used to smooth the aggregate 18 over the surface of the layer 16 so that it is uniformly and evenly dispersed over the surface. As discussed previously, this may be a single layer of the aggregate 18. If uncured, the moisture impervious material 16 may be allowed to cure or set or otherwise harden so that the aggregate 18 remains embedded and fixed within the layer 16 so that it is coupled and retained therein. The moisture impervious layer 16 should have sufficient adhesive properties so that it stays adhered to the fabric layer 14 and the aggregate material 18 remains embedded and retained on the layer 16 during normal use. In certain instances, the sheet material 12 may be manually constructed.

Figure 2:
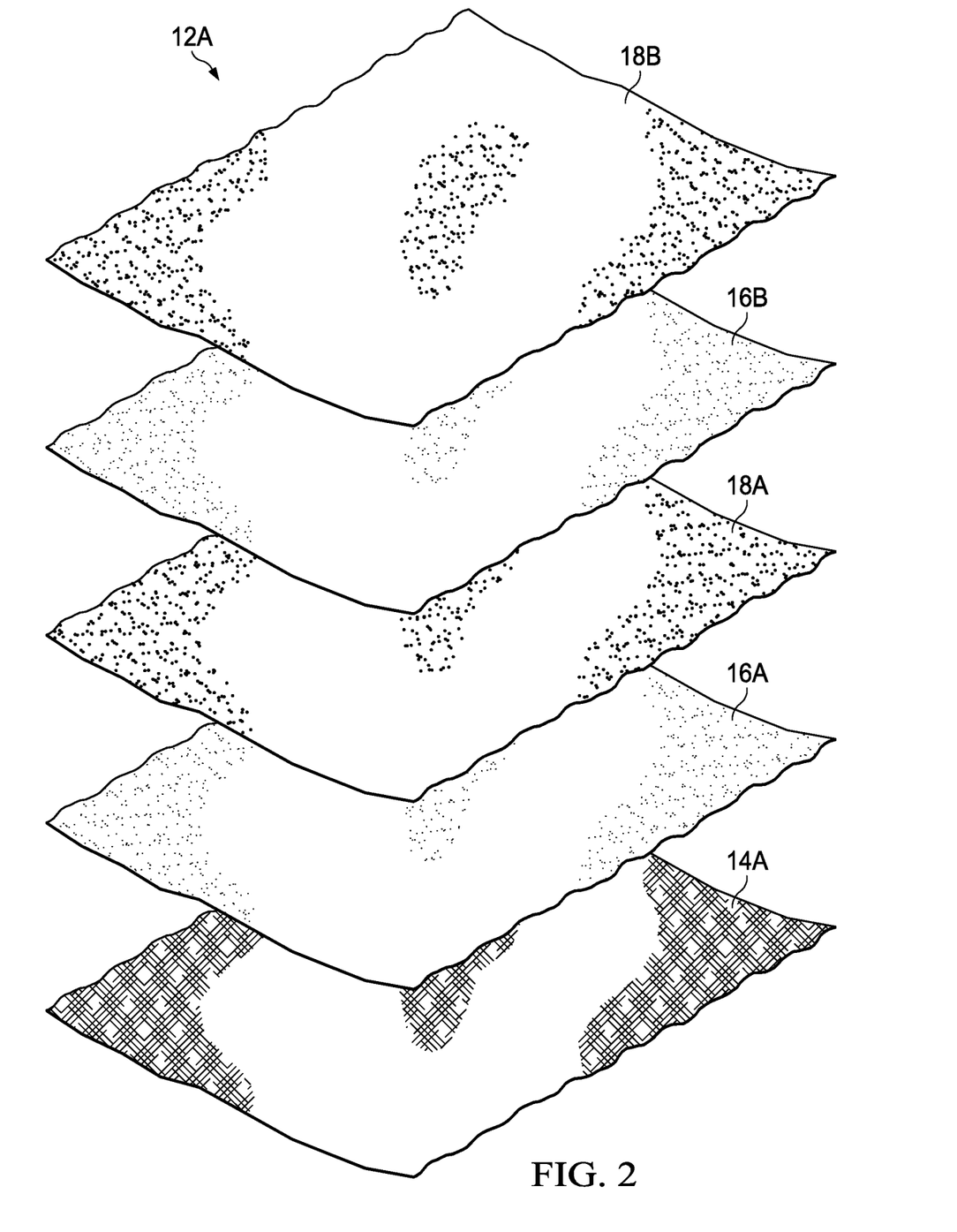
FIG. 2 is an exploded perspective view of a section of soil stabilization and strengthening material employing additional layers of material and configured in accordance with another embodiment of the invention.

Referring to FIG. 2, in some embodiments, particularly where more rigid sheets are required, additional layers of moisture impervious material and aggregate may be used. Here a soil stabilization and strengthening sheet 12A is formed from a geotextile layer 14A, which may be the same or similar to the geotextile material 14 of FIG. 1. A moisture impervious material 16A is coupled to the upper surface of layer 14A and an aggregate layer 18A is applied and embedded in the material of layer 16A. The layers 16A and 18A may be the same or similar to the materials 16 and 18 of FIG. 1, previously described. Here, however, additional upper moisture impervious layer 16B and aggregate layer 18B are applied and coupled to the layers 16A and 18A. In certain instances, the lower aggregate material of layer 18A may be of a larger particle size than the aggregate of upper layer 18B. For example, the average particle size of the aggregate of layer 18A may be from >1 to 5 times larger than the average particle size of the aggregate of layer 18B. In particular embodiments, the average particle size of the aggregate material of the underlying layer 18A of the soil stabilization and strengthening sheet material 12A may be at least, equal to, and/or between any two of 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 times larger than the average particle size of the aggregate of the upper layer 18B. As an example, the average aggregate particle size of layer 18A may be from 2 mm to 4 mm, with the average particle size of the upper aggregate layer 18B being from 1 mm to 2 mm. In other embodiments, the average particle sizes for both layers 18A, 18B may be the same or similar.

The thus formed sheet material 12 (or 12A) may be formed into continuous sheets of various lengths and widths and may be rolled into rolls, such as the roll 10 of FIG. 1, for transport and storage. For ease of description, reference to sheet 12 will be made hereinafter, although it will be understood that this may also be a multilayer aggregate sheet material, such as sheet 12A. The roll 10 also facilitates ease of installation, with the sheet material 12 being readily unrolled over the area to be covered. In particular embodiments, the sheets or rolls may have a width of from 3 feet to 20 feet, more particularly a width of from 6 feet to 15 feet, and still more particularly from 10 feet to 12 feet. Furthermore, each sheet 12, which may be in a roll 10, may have a length of from 10 feet to 300 feet or more. In practice, the rolls 10 may be provided in preformed lengths and widths of various sizes so that they may be selected to provide the desired area of coverage.

In use the sheets 12 or rolls 10 are provided to a site where soil stabilization and strength is desired. A length of the sheet material 12 may be unrolled from the roll 10 and cut, if necessary, and applied to the earth, soil or ground plants where soil stabilization and strengthening is desired. These areas may be flat, sloped, contoured, uneven, etc., with the flexible sheet 12 conforming to the contours of the underlying area. The lower surface of the fabric layer 14 is positioned against and engages the selected area where the sheet 12 is applied, with the moisture impervious material 14 and aggregate 16 being exposed. The weight of the flexible sheet 12 facilitates close contact of the sheet 12 with the entire or substantially entire underlying surface and provides a steady pressing force against the earth surface on which it is applied to retain it in place and so it closely conforms to the contours of the earth to prevent water or moisture from flowing beneath the sheet 12 that might result in weakening the soil or causing erosion.

Figure 3:
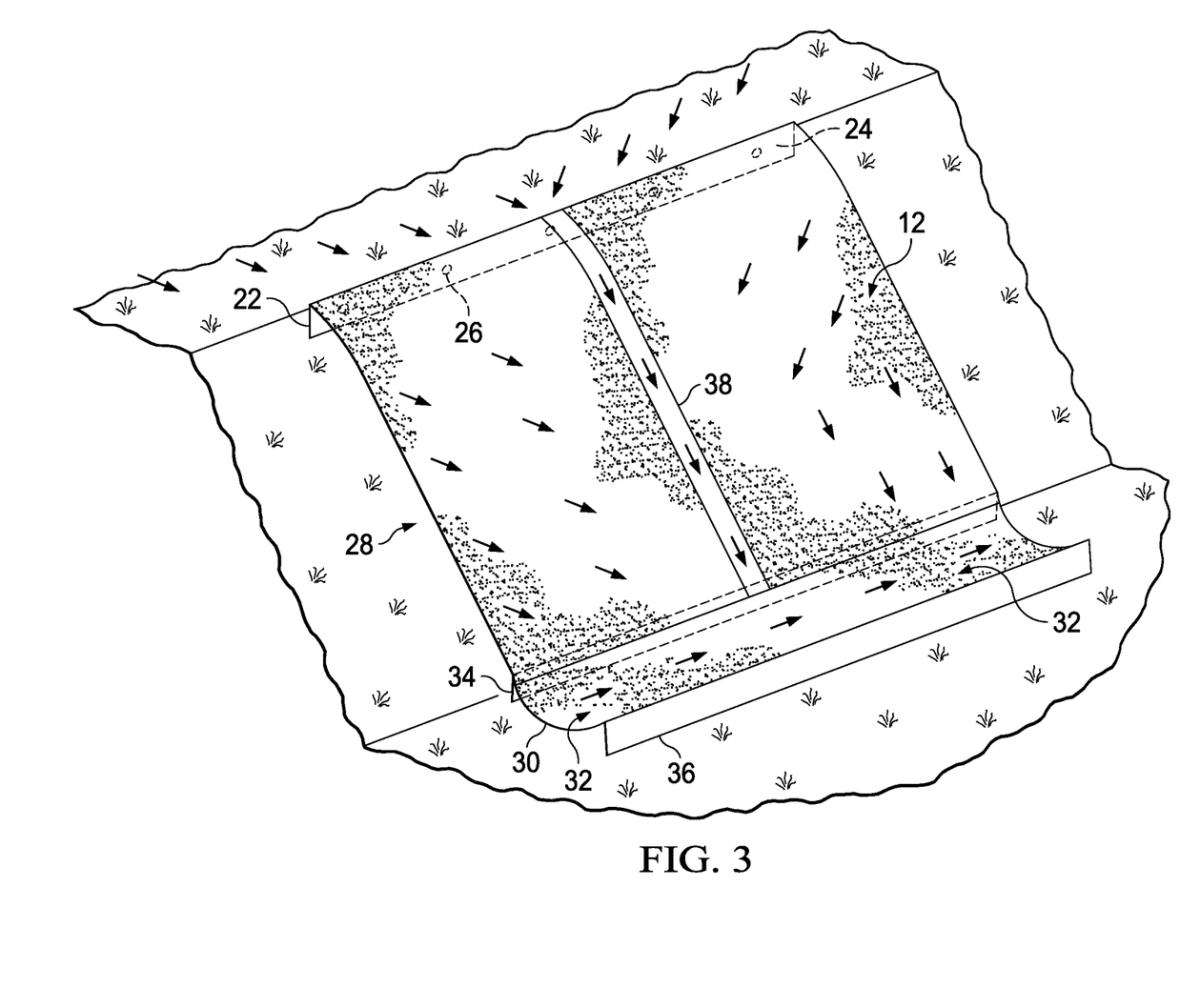
FIG. 3 is a perspective view of an area where soil stabilization and strengthening is desired, shown with multiple sheets of the soil stabilization and strengthening material of FIG. 1 applied to and positioned over the area.

As shown in FIG. 3, the sheet or sheets 12 may be applied at or along a drainage ditch, a roadside, a construction site, a landscape area, a bank or shore of waterway or body of water, etc. These areas may be sloped areas of earth that are prone to erosion. In installation, a slit trench or channel 22 is dug or formed in the earth or soil at the uppermost or highest area of elevation where the sheet material 12 is to be applied. Across the width of the sheet 12, an end portion or anchor strip 24 of the sheet material 12 from 4 inches to 12 inches in length, more typically from 4 inches to 8 inches, is bent or folded down and located within the trench or channel 22. The trench or channel is then filled with earth or soil to cover and retain the anchor strip 24. In this way, the folded and buried strip 24 prevents water or moisture from passing under the sheet 12. The sheet material 12 may be staked to the ground using garden spikes or other fasteners that are received within apertures 26 that are provided along the exposed side edge of the sheet 12 adjacent to the anchor strip 24 and along other areas of the sheet 12, such as along the exposed side edges. In certain applications, no stakes are used, but rather the anchored strips 24 and/or weight of the sheet material itself is used to retain the sheet 12 in place. As shown, the sheet 12 extends down the sloped area 28 of a water valley, which leads to a drainage ditch 30.

Two or more sheets 12 may be used to cover an area where soil stabilization and stability is desired. In FIG. 3, a second lower sheet 32 of sheet material, which may be constructed the same or like the sheet material 12 or 12A, is used to cover the drainage ditch 30. Opposite end portions or anchor strips 34, 36 sheet 32 are also folded or bent down and buried in slit trenches or channels dug or formed on opposite sides of the drainage ditch 30. The lower end of the sheet 12 may be positioned in an overlapping arrangement where the lower side edge of sheet 12 overlaps the adjacent side edge of the sheet 32, such as in an overlapping shingle type relationship, where the lower edge of the adjacent uppermost sheet overlaps the upper edge of a lower adjacent sheet. In other instances, the sheets may be adjacent to one another where they are in a touching relationship or in non-touching but close proximity so that only a short gap or space (e.g., 6 inches or less) is provided between the sheets 12.

Coupling devices 38 may be used to secure the multiple sheets 12 together, such as along lateral side edges. These may be in the form of one or more narrow strips 38 of material along the side edges that may have a length that is the same or different than the length and width of the sheet 12. The strips 38 may be of the same or similar material and construction to the sheet 12 or they may be of a different material. In cases where the strips 38 are the same or a similar material, these strips 38 may be pre-formed (i.e., previously formed and cut to size and length) or be formed on site using a cut section of the sheet material 12 or manually formed on site from similar components, including the same or similar fabric 14, moisture impervious material 16, and aggregate, as has been previously described.

The soil stabilization and strengthening material provides a moisture impervious surface material that is useful for increasing soil stabilization and strength and preventing erosion in a wide variety of areas and applications. It is long-lasting and durable, resistant to moisture and light (e.g., UV light), and may provide an attractive appearance when applied to the area where soil stabilization and strengthening is to be prevented. The weight of the material keeps it in place and causes the material to be firmly pressed over the surface on which it is placed so that water, runoff, etc., flows over the soil stabilization material and is prevented from flowing under it.

While the invention has been shown in some of its forms, it should be apparent to those skilled in the art that it is not so limited but is susceptible to various changes and modifications without departing from the scope of the invention. Accordingly, it is appropriate that the appended claims be construed broadly and in a manner consistent with the scope of the invention.

I claim:

1. A method of maintaining soil strength and stability comprising:
   positioning a sheet of soil stabilization and strengthening material on a selected area where stability and strength of soil is desired, the sheet of soil stabilization and strengthening material comprising:
      a fabric layer that forms a base of the soil stabilization and strengthening material, the lower surface of the fabric layer being positioned against and engaging the selected area;
      a moisture impervious layer coupled to the upper surface of the fabric layer;
      a particulate aggregate material embedded in the moisture impervious layer;
      a second moisture impervious layer positioned over and coupled to the upper surface the moisture impervious layer having the particulate aggregate material embedded therein; and
      a second particulate aggregate material embedded in the second moisture impervious layer, the particulate aggregate material embedded in the moisture impervious layer having an average particle size that is from >1 to 5 times larger than the average particle size of the second particulate aggregate material, and wherein
      the particulate aggregate material embedded in the moisture impervious layer having an average particle size of from 2 mm to 4 mm and wherein the average particle size of the second particulate aggregate material is from 1 mm to 2 mm.

2. The method of claim 1, wherein:
the fabric layer is a geotextile.

3. The method of claim 1, wherein:
the fabric layer is permeable to moisture.

4. The method of claim 1, wherein:
the fabric layer is at least one of woven, non-woven, needle punched, and heat bonded fabric material.

5. The method of claim 4, wherein:
the fabric layer is a polymeric fiber material is at least one of polypropylene, polyethylene, polyester, polyamide, and polyurea.

6. The method of claim 1, wherein:
the moisture impervious layer is a rubber and/or elastomeric material.

7. The method of claim 6, wherein:
the rubber and/or elastomeric material is formed from at least one of polymers and copolymers of urethane, silicone, acrylate, vinyl chloride, acrylonitrile, ethylene, propylene, butadiene, isoprene, styrene, vinyl acetate, methacrylate, methyl methacrylate, vinyl acetate, and combinations of these.

8. The method of claim 1, wherein:
the fabric layer has a thickness of from 0.5 mm to 7.0 mm, a weight of from 3 oz/yd$^2$ to 50 oz/yd$^2$ as measured according to ASTM D5261, and a grab tensile strength of from 50 lbs to 1000 lbs, as measured according to ASTM D4632.

9. The method of claim 1, wherein:
the moisture impervious layer has a thickness of from 0.5 mm to 7.0 mm and a weight of from 3 oz/yd$^2$ to 250 oz/yd$^2$.

10. The method of claim 1, wherein:
the aggregate covers from 5% to 99% of the surface of the moisture impervious layer.

11. The method of claim 1, wherein:
the weight of the particulate aggregate material of the sheet of soil stabilization and strengthening material is from 5 oz/yd$^2$ to 500 oz/yd$^2$.

12. The method of claim 1, wherein:
the sheet of soil stabilization and strengthening material has a width of from 3 feet to 20 feet and a length of from 10 feet to 300 feet.

13. The method of claim 1, wherein:
the selected area is at least one of a sloped area, a drainage ditch, a roadside, a construction site, a landscape area, a bank or shore of waterway, and a bank or shore of a body of water.

14. The method of claim 1, further comprising:
bending or folding an end portion of the sheet material in a slit trench or channel formed in the earth or soil at the uppermost or highest area of elevation of the selected area and filling the trench or channel with the sheet material with earth or soil to cover and retain the end portion therein.

15. The method of claim 1, wherein:
the particulate aggregate material comprises at least one of small gravel, pea gravel, crushed granite, stone material, coarse sand, ground oyster shells.

16. A method of maintaining soil strength and stability comprising:
   positioning a sheet of soil stabilization and strengthening material on a selected area where stability and strength of soil is desired, the sheet of soil stabilization and strengthening material having a width of from 3 feet to 20 feet and a length of from 10 feet to 300 feet, the sheet of soil stabilization and strengthening material comprising:
      a geotextile fabric layer that is at least one of a woven, non-woven, needle punched, and heat bonded fabric material and is permeable to moisture and forms a base of the soil stabilization and strengthening material, the lower surface of the fabric layer being positioned against and engaging the selected area, the fabric layer having a thickness of from 0.5 mm to 7.0 mm, a weight of from 3 oz/yd² to 50 oz/yd² as measured according to ASTM D5261, and a grab tensile strength of from 50 lbs to 1000 lbs, as measured according to ASTM D4632;

a moisture impervious layer that is a rubber and/or elastomeric material coupled to the upper surface of the fabric layer, the moisture impervious layer having a thickness of from 0.5 mm to 7.0 mm and a weight of from 3 oz/yd² to 250 oz/yd²; and a particulate aggregate material embedded in the moisture impervious layer, the particulate aggregate material having an average particle size of from 2 mm to 4 mm and covering from 5% to 99% of the surface of the moisture impervious layer, the weight of the particulate aggregate material of the sheet of soil stabilization and strengthening material being from 5 oz/yd² to 500 oz/yd²;

a second moisture impervious layer positioned over and coupled to the upper surface the moisture impervious layer having the particulate aggregate material embedded therein; and a second particulate aggregate material embedded in the second moisture impervious layer, the particulate aggregate material embedded in the moisture impervious layer having an average particle size that is >1 to 5 times larger than the average particle size of the second particulate aggregate material, the average particle size of the second particulate aggregate material being from 1 mm to 2 mm.

17. The method of claim 16, wherein:
the geotextile fabric layer is a polymeric fiber material of at least one of polypropylene, polyethylene, polyester, polyamide, and polyurea.

18. The method of claim 16, wherein:
the rubber and/or elastomeric material is formed from at least one of polymers and copolymers of urethane, silicone, acrylate, vinyl chloride, acrylonitrile, ethylene, propylene, butadiene, isoprene, styrene, vinyl acetate, methacrylate, methyl methacrylate, vinyl acetate, and combinations of these.

19. The method of claim 16, wherein:
the selected area is at least one of a sloped area, a drainage ditch, a roadside, a construction site, a landscape area, a bank or shore of waterway, and a bank or shore of a body of water.

20. The method of claim 16, wherein:
the particulate aggregate material comprises at least one of small gravel, pea gravel, crushed granite, stone material, coarse sand, ground oyster shells.

* * * * *